Oct. 22, 1957  H. T. WHITE  2,810,348
MOTOR DRIVEN PUMP
Filed Dec. 8, 1954  2 Sheets-Sheet 1

FIG. 1

*INVENTOR.*
HOWARD T. WHITE
BY
*ATTORNEY*

Oct. 22, 1957        H. T. WHITE        2,810,348

MOTOR DRIVEN PUMP

Filed Dec. 8, 1954        2 Sheets-Sheet 2

*INVENTOR.*
HOWARD T. WHITE
BY
ATTORNEY

United States Patent Office 2,810,348
Patented Oct. 22, 1957

2,810,348

MOTOR DRIVEN PUMP

Howard T. White, Melrose Park, Pa.

Application December 8, 1954, Serial No. 473,800

6 Claims. (Cl. 103—87)

This invention relates to motor driven pumps.

It is the principal object of the present invention to provide a motor driven pump for the pumping of fluids having an improved rotor construction.

It is a further object of the present invention to provide a motor driven pump in which the motor stator is isolated from the motor rotor and in which the pump and motor are combined in an improved manner.

It is a further object of the present invention to provide a motor driven pump in which the motor stator is isolated and in which improved arrangements are provided for cooling.

It is a further object of the present invention to provide a motor driven pump in which the pump is of the expansible chamber type and is connected to the motor in an improved manner.

It is a further object of the present invention to provide an improved motor driven pump in which the parts exposed to the fluid being pumped can be made of corrosion or erosion resistant materials.

Other objects and advantageous features of the invention will be apparent from the specification and claims.

The nature and characteristic features of the invention will be more readily understood from the following description, taken in connection with the accompanying drawings forming part thereof, in which:

Figure 1 is a longitudinal sectional view of a motor driven pump in accordance with the invention;

Figure 2:
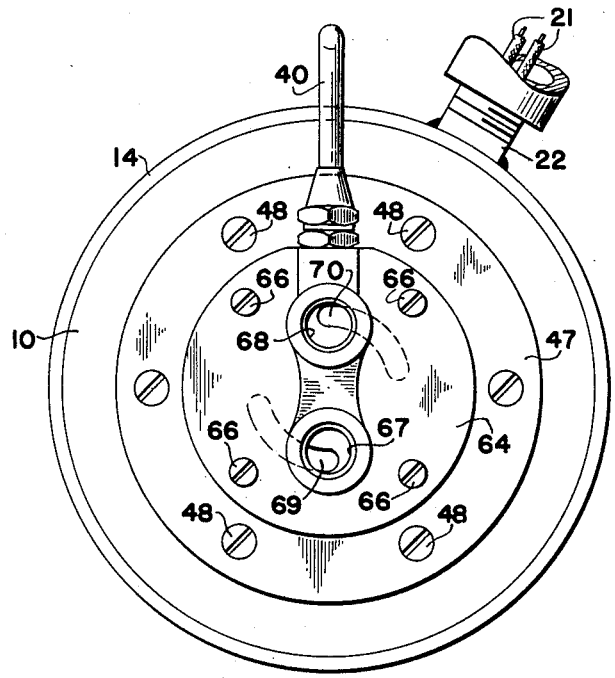
Fig. 2 is an end elevational view as seen from the left of Fig. 1.

It should, of course, be understood that the description and drawings herein are illustrative merely, and that various modifications and changes may be made in the structure disclosed without departing from the spirit of the invention.

Like numerals refer to like parts throughout the several views.

Referring now more particularly to the drawings, the motor driven pump in accordance with the present invention herein illustrated preferably includes spaced end frame plates 10 and 11 of any desired material, cast iron being suitable. An outer cylindrical housing 12 is provided which may have interior shoulders 13 abutting against the end frame plates 10 and 11 for holding these plates in spaced relation and end flanges 14 staked over complemental peripheral rims 15 of the plates 10 and 11.

Each of the plates 10 and 11 has a central opening 16 for the reception of a hollow cylindrical sleeve 17 of non-magnetic responsive material such as stainless steel. The sleeve 17 is secured at its ends and held in fluid tight relation to the frame plates 10 and 11 in any desired manner such as by welding, annular grooves 18' being provided for this purpose.

The space enclosed between the end frame plates 10 and 11, and between the housing 12 and the sleeve 17, provides a motor stator chamber 18. Within the chamber 18, field windings 19 and laminated field pieces 20 are provided, the windings 19 being energized from any suitable source of alternating current delivered by conductors 21 which extend through a fitting 22 welded to the housing 12.

A rotor chamber 25 is provided within the interior of the sleeve 17. The chamber 25 is closed at one end by an end closure 26 which extends into engagement with the sleeve 17 at one end, as at 26a, to axially align and position the closure 26 and has a mounting plate portion 27 extending outwardly along the end plate 11 to which it is secured by studs 28 extending into blind internally threaded holes 29 in the plate 11. A gasket 30 is preferably interposed between the plate portion 27 and the exterior of the end plate 11 to prevent fluid leakage at this location.

The end closure 26 has a central cylindrical boss portion 31 with an axial bore 32 for the reception of a bearing sleeve 33 of graphite or the like. The sleeve 33 is closed and secured within a metal collar 34, has exterior longitudinal grooves 35 for circulation of liquid therealong and an exterior end section 36 of reduced external diameter to permit of fluid flow. The transverse end face of the sleeve 33 opposite the end section 36 provides an end thrust face for purposes to be explained.

A pin 37, extending through the boss 31 and the collar 34, holds the collar 34 and the sleeve 33 therein in position. The boss 31 is provided at the outer end thereof with a threaded connection 39 for the connection of a supply pipe 40.

The rotor chamber 25 at its other end is closed by an end closure 45 which preferably also provides a pump housing as will be hereinafter explained.

The closure 45 has a portion 46 extending into engagement with the sleeve 17 to axially align and position the closure 45 and has a plate portion 47 extending outwardly along the end plate 10 to which it is secured by studs 48 extending into blind internally threaded holes 49 in the plate 10.

A gasket 50 is preferably interposed between the plate portion 47 and the exterior of the end plate 10 to prevent fluid leakage at this location.

The closure 45 has a central cylindrical boss portion 51 axially aligned with the boss portion 31 and with an axial bore 52 for the reception of a bearing sleeve 53 of graphite or the like. The sleeve 53 is enclosed and secured within a metal collar 54, has exterior longitudinal grooves 55 for circulation of liquid therealong and an exterior end section 56 of reduced external diameter to permit of fluid flow. The transverse end face of the sleeve 53 opposite the end section 56 provides an end thrust face for purposes to be explained.

A pin 57, extending through the boss 51 and the collar 54 holds the collar 54 and the sleeve 53 therein in position.

The boss 51 has integral therewith a pump housing section 55 with a bore 58 for the reception of a replaceable cylinder liner 59 eccentrically disposed therein and which may have an interior surface 60 shaped as illustrated to guide the pump rotor elements as hereinafter explained. The pump housing section 55 has a stepped bore 61 for the reception of a pump rotor bearing 62 which may be of graphite or the like.

The space within the surface 60 bounds a pump chamber 63 which is closed by a pump head 64 having an inner end face 65.

The pump head 64 is held in position on the pump housing section 55 by studs 66 and has a fluid inlet connection 67 and a fluid delivery connection 68. The fluid inlet connection 67 is in communication with an inlet port 69 in the end face 65 and the delivery connection 68 has a delivery port 70 in the end face 65 in communication therewith.

The pump chamber 63 has a port 71 extending therefrom in communication with the rotor chamber 25 and approximately aligned with the inlet connection 67.

The delivery connection 68 has a threaded connection 72 in communication therewith for the supply pipe 40.

Within the rotor chamber 25, a motor rotor 75 is provided, which may be of any preferred type, a laminated short circuited type being suitable. If the rotor 75 is to be used for the pumping of corrosive liquids or of erosive liquids the rotor laminations can be enclosed within a cylindrical outer cover 76 of corrosive or erosive resistant sheet material, stainless steel being suitable for some purposes.

End cover plates 77 may also be provided, of resistant sheet material of the same type as the cover 76.

The motor rotor 75 is mounted on a motor shaft 78 which is provided with thrust rings 79 and 80 thereon for engagement with the end faces of the bearing sleeves 33 and 53, and extends through these sleeves which serve as journals therefor.

The shaft 78 has a coupling slot 81 for engagement by a coupling tongue 82 on a shaft 83 journaled in the bearing 61 and extending from a pump rotor 84. The pump rotor 84 has radial slots 85 for the reception of sliding vanes 86. The vanes 86 are impelled outwardly in any desired manner, such as centrifugally by their weight upon rotation of the rotor 84, so as to engage the surface 60 which limits their outward movement and also upon their advance along the surface 60 urges the vanes 86 inwardly.

The mode of operation will now be pointed out.

Figure 3:
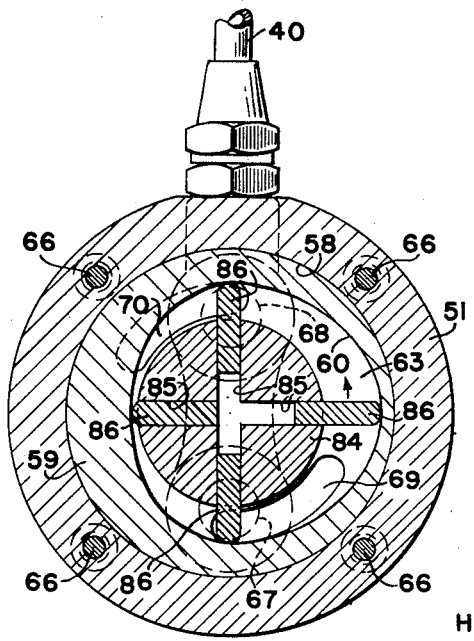
Fig. 3 is an enlarged transverse sectional view taken approximately on the line 3—3 of Fig. 1.

Upon energization of the windings 19, a rotating field is set up in the laminations 20 which is effective upon the motor rotor 75 for rotating it together with the shaft 78, the shaft 83 and the pump rotor 84. The pump rotor 84 moves in a counterclockwise direction as seen in Fig. 3.

Fluid enters at the fluid inlet connection 67 and by the inlet port 69 and passes or is drawn into the pump chamber 63. Upon rotation of the pump rotor 84 in the pump chamber 63, fluid is delivered by the vanes 86 to the delivery port 70 and fluid delivery connection 68 for use.

As the fluid is being pumped, a portion is bypassed for cooling and for lubrication and passes through the connection 70, the pipe 40, and the connection 39, passes along the interior of the boss 31 and the exterior of the shaft 78, between the sleeve 33 and the shaft 78 and along the grooves 35, then in the clearance between the cover 76 and the sleeve 17, then through the port 71 to the pump chamber 63. A portion of the bypassed fluid is accessible along the grooves 55 and between the sleeve 53 and the shaft 78, for lubrication of the bearing sleeve 53.

Access to the pump rotor 84 may be readily had, if desired, upon removal of the studs 66 and withdrawal of the pump head 64. Access to the motor rotor 75 may be readily had, if desired, from either end upon disconnection of the pipe 40 and removal of either the studs 28 and the closure 26 or the studs 48 and the closure 45.

I claim:

1. A motor driven pump comprising spaced end plate members having extending therebetween in spaced relation an outer housing and an inner hollow cylindrical sleeve, the space between said plate members, said housing and said sleeve providing a motor stator chamber, a motor stator in said motor stator chamber, the interior of said sleeve providing a motor rotor chamber, closures for the ends of said motor rotor chamber detachably engaged with said plate members, each of said closures having a cylindrical portion extending axially inwardly within said sleeve and having a bearing mounted in said portion, a shaft journaled in said bearings, a motor rotor on said shaft in said motor rotor chamber and interposed between said bearings, one of said closures having an end opening with a pump rotor chamber therein, said pump rotor chamber having a fluid inlet portion and a fluid delivery portion, a pump rotor in said pump rotor chamber and having a shaft extending therefrom and connected to said first shaft within said one of said closures, an end head for said end opening detachably secured to said one of said closures and having fluid inlet and fluid delivery connections connected respectively to said fluid inlet and fluid delivery portions, said one of said closures having a fluid conduit from the inlet portion of said pump rotor chamber to and in communication with said motor rotor chamber, the other of said closures having a fluid port in communication with said delivery connection and said motor rotor chamber, said conduit and said port providing for by-passing of fluid through said motor rotor chamber for cooling said motor rotor.

2. A motor driven pump comprising spaced end plate members having extending therebetween in spaced relation an outer housing and an inner hollow cylindrical sleeve, the space between said plate members, said housing and said sleeve providing a motor stator chamber, a motor stator in said motor stator chamber, the interior of said sleeve providing a motor rotor chamber, closures for the ends of said motor rotor chamber detachably engaged with said plate members, each of said closures having a cylindrical portion extending axially inwardly within said sleeve and having a bearing mounted in said portion, a shaft journaled in said bearings, a motor rotor on said shaft in said motor rotor chamber and interposed between said bearings, one of said closures having an end opening with a pump rotor chamber therein, said pump rotor chamber having a fluid inlet portion and a fluid delivery portion, a pump rotor in said pump rotor chamber and having a shaft extending therefrom and detachably coupled to said first shaft within said one of said closures, an additional bearing in said one of said end closures for said pump rotor shaft, an end head for said end opening detachably secured to said one of said closures and having fluid inlet and fluid delivery connections respectively connected to said fluid inlet and fluid delivery portions, said one of said closures having a fluid conduit from the inlet portion of the pump rotor chamber to and in communication with said motor rotor chamber, the other of said closures having a fluid port in communication with said delivery connection and said motor rotor chamber, said conduit and said port providing for by-passing of fluid through said motor rotor chamber for cooling said motor rotor.

3. A motor driven pump comprising spaced end plate members having extending therebetween in spaced relation an outer housing and an inner hollow cylindrical sleeve, the space between said plate members, said housing and said sleeve providing a motor stator chamber, a motor stator in said motor stator chamber, the interior of said sleeve providing a motor rotor chamber, closures for the ends of said motor rotor chamber, each of said closures having a cylindrical portion extending axially into said sleeve and a portion exteriorly disposed in facing relation to one of said plate members and detachably secured thereto, each of said closures having a bearing mounted in said cylindrical portion, a shaft journaled in said bearings, a motor rotor on said shaft in said motor rotor chamber and interposed between said bearings, one of said closures having an end opening with a pump rotor chamber therein, said pump rotor chamber having fluid inlet and fluid delivery portions, a pump rotor in said pump rotor chamber and having a shaft extending therefrom and detachably coupled to said first shaft within said one of said closures, an additional bearing in said one of said closures for said pump rotor shaft, and an end head for said opening detachably secured to said one of said closures and having fluid inlet and fluid delivery connections connected respectively to said fluid inlet and fluid delivery portions.

4. A motor driven pump comprising spaced end plate members having extending therebetween in spaced relation an outer housing and an inner hollow cylindrical sleeve, the space between said plate members, said housing and said sleeve providing a motor stator chamber, a motor stator in said motor stator chamber, the interior of said sleeve providing a motor rotor chamber, closures for the ends of said motor rotor chamber, each of said closures having a cylindrical portion extending axially into said sleeve and a portion exteriorly disposed in facing relation to one of said plate members and detachably secured thereto, each of said closures having a bearing mounted in said cylindrical portion, a shaft journaled in said bearings and interposed between said bearings, a motor rotor on said shaft in said motor rotor chamber, one of said closures having a pump rotor chamber therein open at one end, said pump rotor chamber having fluid inlet and fluid delivery portions, a pump rotor in said pump rotor chamber and having a shaft extending therefrom and detachably coupled to said first shaft within said one of said closures, said one of said closures having an outer end face, and an end head detachably engaging said end face and closing said end of said pump rotor chamber and having fluid inlet and fluid delivery connections connected respectively to said fluid inlet and fluid delivery portions.

5. A motor driven pump comprising spaced end plate members having extending therebetween in spaced relation an outer housing and an inner hollow cylindrical sleeve, the space between said plate members, said housing and said sleeve providing a motor stator chamber, a motor stator in said motor stator chamber, the interior of said sleeve providing a motor rotor chamber, closures for the ends of said motor rotor chamber, each of said closures having a cylindrical portion extending axially into said sleeve and a portion exteriorly disposed in facing relation to one of said plate members and detachably secured thereto, each of said closures having a bearing mounted in said cylindrical portion, a shaft journaled in said bearings, a motor rotor in said motor rotor chamber on said shaft and interposed between said bearings, one of said closures having a pump rotor chamber therein open at one end, said pump rotor chamber having fluid inlet and fluid delivery portions, a pump rotor in said pump rotor chamber and having a shaft extending therefrom and detachably coupled to said first shaft within said one of said closures, an additional bearing in said one of said closures for said pump rotor shaft, said one of said closures having an outer end face, an end head engaging said end face and closing said end of said pump rotor chamber and having fluid inlet and fluid delivery connections connected respectively to said fluid inlet and fluid delivery portions, said one of said closures having a fluid conduit from the inlet portion of said pump rotor chamber to and in communication with said motor rotor chamber, the other of said closures having a fluid port in communication with said delivery connection and said motor rotor chamber, said conduit and said port providing for bypassing of fluid through said motor rotor chamber for cooling said motor rotor.

6. A motor driven pump comprising spaced end plate members having extending therebetween in spaced relation an outer housing and an inner hollow cylindrical sleeve, said housing and said sleeve being permanently secured to said plate members, the space between said plate members, said housing and said sleeve providing a motor stator chamber, a motor stator in said motor stator chamber, the interior of said sleeve providing a motor rotor chamber, closures for the ends of said motor rotor chamber, each of said closures having a cylindrical portion extending axially into said sleeve and a portion exteriorly disposed in facing relation to one of said plate members and detachably secured thereto, gasket members between said plate members and said facing portions, each of said closures having a bearing mounted in said cylindrical portion, a shaft journaled in said bearings, a motor rotor on said shaft in said motor rotor chamber and interposed between said bearings, one of said closures having a pump rotor chamber therein open at one end, said pump rotor chamber having fluid inlet and fluid delivery portions, a pump rotor in said pump rotor chamber and having a shaft extending therefrom and detachably coupled to said first shaft within said one of said closures, an additional bearing in said one of said closures for said pump rotor shaft, said one of said closures having an outer end face, an end head engaging said end face and closing said pump rotor chamber and having fluid inlet and fluid delivery connections respectively in communication with said fluid inlet and fluid delivery portions, said one of said closures having a fluid conduit from the inlet portion of said pump rotor chamber to said motor rotor chamber, the other of said closures having a fluid port in communication with said fluid delivery connection and said motor rotor chamber, said conduit and said port providing for bypassing of fluid to said motor rotor chamber for cooling said motor rotor.

References Cited in the file of this patent
UNITED STATES PATENTS

| | | |
|---|---|---|
| 1,973,070 | Hess et al. | Sept. 11, 1934 |
| 2,120,914 | Vogel | June 14, 1938 |
| 2,669,187 | Guyer | Feb. 16, 1954 |
| 2,722,892 | French | Nov. 8, 1955 |
| 2,741,990 | White | Apr. 17, 1956 |